(12) United States Patent
Tao et al.

(10) Patent No.: US 7,970,290 B2
(45) Date of Patent: Jun. 28, 2011

(54) DIGITAL PHASE ESTIMATOR, DIGITAL PHASE LOCKED LOOP AND OPTICAL COHERENT RECEIVER

(75) Inventors: Zhenning Tao, Beijing (CN); Lei Li, Beijing (CN); Jens C. Rasmussen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 696 days.

(21) Appl. No.: 12/026,782

(22) Filed: Feb. 6, 2008

(65) Prior Publication Data

US 2008/0205905 A1 Aug. 28, 2008

(30) Foreign Application Priority Data

Feb. 26, 2007 (CN) .......................... 2007 1 0078758

(51) Int. Cl.
*H04B 10/06* (2006.01)
*H04B 10/08* (2006.01)
(52) U.S. Cl. ...................... 398/202; 398/25; 398/208
(58) Field of Classification Search ............. 398/25–27, 398/33, 202–204, 208; 375/294, 327, 373, 375/375, 376
See application file for complete search history.

(56) References Cited

U.S. PATENT DOCUMENTS

| | | | | |
|---|---|---|---|---|
| 6,366,574 B1 * | 4/2002 | Baissus et al. | ................ | 370/350 |
| 2007/0041474 A1 * | 2/2007 | Gurney et al. | ................ | 375/332 |

OTHER PUBLICATIONS

Ly-Gagnon, D. et al., Unrepeated 210-km Transmission with Coherent Detection and Digital Signal Processing of 20-Gb/s QPSK Signal, University of Tokyo, Tokyo, Japan (3 pages), 2005.
Kazovsky, L., Decision-Driven Phase-Locked Loop for Optical Homodyne Receivers: Performance Analysis and Laser Linewidth Requirements, Journal of Lightwave Technology, vol. LT-3, No. 6, Dec. 1985.
Proakis, John G., *Digital Communications*, Fourth Edition McGraw-Hill, Inc., table of contents including pp. xi-xvii, pp. 342-343 (6 pages), 1983.

* cited by examiner

*Primary Examiner* — Dalzid Singh
(74) *Attorney, Agent, or Firm* — Staas & Halsey LLP

(57) ABSTRACT

The present invention provides a digital phase estimator, a digital phase locked loop and an optical coherent receiver. The optical coherent receiver comprises a local oscillator laser, for supplying a local oscillator optical signal; an optical 90 degree frequency mixer, for mixing a received optical signal with the local oscillator optical signal; first and second balancing photoelectric detectors, for converting the optical signals outputted from the optical 90 degree frequency mixer into baseband electrical signals; first and second A/D converters, for respectively converting output signals from the first and the second balancing photoelectric detectors into digital signals; a digital phase locked loop, for compensating a phase difference between a carrier signal of the received optical signal and the local oscillator optical signal, and outputting the compensated signal; and a data recovering unit, for recovering data from the compensated signal.

22 Claims, 6 Drawing Sheets

DIGITAL PHASE ESTIMATOR, DIGITAL PHASE LOCKED LOOP AND OPTICAL COHERENT RECEIVER

This application claims the priority benefit of Chinese Patent Application No. 200710078758.7, filed Feb. 26, 2007 in the Chinese Patent Office, the disclosure of which is herein incorporated in its entirety by reference.

TECHNICAL FIELD

The present invention relates in general to optical communication systems, and in particular to a digital phase estimator and a digital phase locked loop suitable for application in various modulation techniques, as well as an optical coherent receiver using the digital phase estimator or the digital phase locked loop.

BACKGROUND

With the increasing requirements on the capacity and flexibility of optical communication systems, the coherent optical communication technology has become increasingly important. In comparison with incoherent technology such as on-off key (OOK) or self-coherent technology such as differential quadrature phase shift key (DQPSK), the coherent technology has the following advantages: it has 3 dB optical signal to noise ratio (OSNR) gain; it is convenient to utilize equalization technology; and it is possible to employ more efficient modulation technologies such as quadrature amplitude modulation (QAM).

Like electrical coherent technology, the optical coherent receiver also needs a device to recover the carrier phase. This can be realized by using an analog phase locked loop, as explained by Leonid G. Kazovsky in "*Decision-Driven Phase-Locked Loop for Optical Homodyne Receivers*", IEEE/OSA Journal of Lightwave Technology, Vol. LT-3, No. 6, December, 1985, P 1238-1247. As shown in FIG. 1, the analog phase locked loop comprises a phase estimator 101, a loop filter 102 and a voltage-controlled oscillator (VCO) 103, also referred to as local oscillator laser. The analog phase locked loop is relatively low in speed due to its inherent loop delay. Moreover, such an analog phase locked loop has the following disadvantages: low control speed due to its long loop delay; high requirements on the phase noise of the carrier and the voltage-controlled oscillator; and large phase error caused by the phase noise, etc.

With the rapid development of the technology of electronic devices in recent years, digital technology has been increasingly employed in optical communications. Dany-Sebastien Ly-Gagnon et al. demonstrated an optical coherent receiver making use of the digital signal processing technology in OFC2005 OTuL4. They used feed-forward phase estimation instead of feedback phase locked loop. FIG. 2 shows such a method. As shown in FIG. 2, the optical coherent receiver comprises a local oscillator laser for supplying a local oscillator optical signal, an optical 90 degree frequency mixer for mixing a received optical signal with the local oscillator optical signal, first and second balancing photoelectric detectors for converting the optical signals outputted from the optical 90 degree frequency mixer into baseband electrical signals; an analog to digital converter (ADC) 201, an argument calculator 202, a decoder 203, and a phase estimator 204.

A first input terminal of the optical 90 degree frequency mixer is connected to an optical input, a second input terminal thereof is connected to an output of the local oscillator laser, and first and second output terminals thereof are respectively connected to input terminals of the first and the second balancing photoelectric detectors; output terminals of the first and the second balancing photoelectric detectors are respectively connected to first and second input terminals of the analog to digital converter 201; first and second output terminals of the analog to digital converter 201 are respectively connected to first and second input terminals of the phase estimator 204 and first and second input terminals of the argument calculator 202; an output terminal of the argument calculator 202 is connected to a first input terminal of the decoder 203, and an output terminal of the phase estimator 204 is connected to a second input terminal of the decoder 203.

The analog to digital converter 201 converts analog cophase signal (I) and quadrature signal (Q) into a digital signal I+jQ, which is a complex signal. The argument calculator 202 obtains the argument, namely the phase, of the complex signal. The phase estimator 204 obtains a phase difference between a carrier signal of the received optical signal and the local oscillator optical signal. The decoder 203 subtracts the phase difference estimated by the phase estimator 204 from the output of the argument calculator 202 to recover the transmitted data.

As shown in FIG. 2, the phase estimator 204 comprises a four times power calculator 205, an averager 207, an argument calculator 206, and a dividing by four calculator 208. First and second input terminals of the four times power calculator 205 are respectively connected to first and second output terminals of the analog to digital converter 201, an output terminal of the four times power calculator 205 is connected to an input terminal of the averager 207, an output terminal of the averager 207 is connected to an input terminal of the argument calculator 206, an output terminal of the argument calculator 206 is connected to an input terminal of the dividing by four calculator 208, and an output terminal of the dividing by four calculator 208 is connected to a second input terminal of the decoder 203.

As can be seen, all of the above calculations are carried out in the digital domain. Here, the digital feed-forward phase estimator is used to replace the analog phase locked loop in the previous optical coherent systems to avoid the defects of the analog phase locked loop as discussed above. However, this method is applicable merely for the phase shift keying (PSK) modulation mode, because the basic principle of this method rests in the subtraction of two phases. The method cannot be applied in more advanced modulation technologies (such as the QAM), whereas such a defect does not exist in the solution of the phase locked loop. On the other hand, all of the four times power calculator 205 and the argument calculators 202 and 206 perform nonlinear computations, and it is very complicated to realize these nonlinear computations by means of hardware or digital signal processing technology.

In view of the aforementioned circumstances, there is currently a pressing need for a novel phase control technique that combines the advantages of the phase locked loop and the digital signal processing technology.

SUMMARY OF THE INVENTION

The present invention is proposed in view of the problems prevailing in the state of the art, and an object of the present invention is to provide a digital phase locked loop and an optical coherent receiver using such a digital phase locked loop possessing the advantages of the phase locked loop solution and the digital signal processing technology at the same time.

According to the first aspect of the present invention, there is provided a digital phase estimator for generating a phase estimation signal, which estimator comprises a first absolute value calculator, for calculating an absolute value of a first input signal; a second absolute value calculator, for calculating an absolute value of a second input signal; a first sign calculator, for obtaining a sign of the first input signal; a second sign calculator, for obtaining a sign of the second input signal; a subtracter, for obtaining a difference of subtracting the absolute value of the first input signal from the absolute value of the second input signal; and a first multiplier, for multiplying the difference between the absolute values of the first input signal and the second input signal with the signs of the first input signal and the second input signal, and outputting the multiplying result as the phase estimation signal; wherein an input terminal of the first absolute value calculator and an input terminal of the first sign calculator are connected to a first external input; an output terminal of the first absolute value calculator is connected to a negative input terminal of the subtracter; an input terminal of the second absolute value calculator and an input terminal of the second sign calculator are connected to a second external input; an output terminal of the second absolute value calculator is connected to a positive input terminal of the subtracter; an output terminal of the subtracter is connected to a third input terminal of the first multiplier; output terminals of the first and the second sign calculators are respectively connected to a first and a second input terminals of the first multiplier; and an output terminal of the first multiplier is connected to an external output.

According to the second aspect of the present invention, there is provided a digital phase estimator according to the first aspect of the present invention, which estimator further comprises a normalizing section, for normalizing the first input signal and the second input signal; and a phase difference calculating section, for calculating a phase difference in accordance with an output of the first multiplier; wherein the normalizing section comprises a first square calculator, for obtaining a square of the first input signal; a second square calculator, for obtaining a square of the second input signal; an adder, for obtaining a summation of the square of the first input signal and the square of the second input signal; a square root calculator, for obtaining a square root of the summation; an inverse number calculator, for calculating an inverse number of the square root; a second multiplier (506), for multiplying the inverse number with the first input signal; and a third multiplier (507), for multiplying the inverse number with the second input signal; and wherein the phase difference calculating section comprises a $1/\sqrt{2}$ calculator, for outputting a value of $1/\sqrt{2}$; a fourth multiplier (510), for multiplying the output of the first multiplier (406) with an output of the $1/\sqrt{2}$ calculator, and outputting the multiplying result; and an arcsine calculator, for performing an arcsine operation on an output of the fourth multiplier (510) to obtain a phase difference.

According to the third aspect of the present invention, there is provided a digital phase locked loop using the digital phase estimator according to the first aspect or the second aspect of the present invention, which loop comprises a loop filter, for filtering a phase estimation signal of the digital phase estimator to remove noise; a modulo integrator, for generating a constellation rotation angle in accordance with the phase estimation signal outputted by the loop filter and removed of noise, and outputting the constellation rotation angle; and a constellation rotator, for rotating the input signal in accordance with the constellation rotation angle to compensate the phase difference between the carrier signal and the local oscillator signal, and outputting the signal having undergone constellation rotation.

According to the fourth aspect of the present invention, there is provided an optical coherent receiver using the digital phase locked loop according to the third aspect of the present invention, which receiver comprises a local oscillator laser, for supplying a local oscillator optical signal; an optical 90 degree frequency mixer, for mixing a received optical signal with the local oscillator optical signal; first and second balancing photoelectric detectors, for converting the optical signals outputted from the optical 90 degree frequency mixer into baseband electrical signals; first and second A/D converters, for respectively converting output signals from the first and the second balancing photoelectric detectors into digital signals; the digital phase locked loop according to the third aspect of the present invention, for compensating a phase difference between a carrier signal of the received optical signal and the local oscillator optical signal, and outputting the compensated signal; and a data recovering unit, for recovering data from the compensated signal.

According to the fifth aspect of the present invention, there is provided an optical coherent receiver using the digital phase estimator according to the first aspect of the present invention, which receiver comprises a local oscillator laser, for supplying a local oscillator optical signal; an optical 90 degree frequency mixer, for mixing a received optical signal with the local oscillator optical signal; first and second balancing photoelectric detectors, for converting the optical signals outputted from the optical 90 degree frequency mixer into baseband electrical signals; an A/D converter, for converting output signals from the first and the second balancing photoelectric detectors into digital signals; an argument calculator, for obtaining a phase of the digital signals; a phase estimating section, for obtaining a phase difference between a carrier signal of the received optical signal and the local oscillator optical signal; and a decoder, for subtracting the phase difference obtained by the phase estimating section from an output of the argument calculator to recover transmitted data; wherein the phase estimating section comprises the phase estimator according to the first aspect of the present invention, for generating a phase estimation signal in accordance with the digital signals; first and second absolute value calculators, for respectively calculating absolute values of first and second outputs of the A/D converter; an adder, for calculating a sum of the absolute values of the first and the second outputs of the to A/D converter; a look up table, for generating a phase difference in accordance with the phase estimation signal and the sum of the absolute values; and an averager, for removing noise from the phase difference.

According to the sixth aspect of the present invention, there is provided an optical coherent receiver using the digital phase estimator according to the first aspect of the present invention, which receiver comprises a local oscillator laser, for supplying a local oscillator optical signal; an optical 90 degree frequency mixer, for mixing a received optical signal with the local oscillator optical signal; first and second balancing photoelectric detectors, for converting the optical signals outputted from the optical 90 degree frequency mixer into baseband electrical signals; an A/D converter, for converting output signals from the first and the second balancing photoelectric detectors into digital signals; an argument calculator, for obtaining a phase of the digital signals; a phase estimating section, for obtaining a phase difference between a carrier signal of the received optical signal and the local oscillator optical signal; and a decoder, for subtracting the phase difference obtained by the phase estimating section from an output of the argument calculator to recover transmitted data; wherein the phase estimating section comprises the phase estimator according to the first aspect of the present invention, for generating a phase estimation signal in accordance with the digital signals; first and second absolute value calculators, for respectively calculating absolute values of first and second outputs of the A/D converter; an adder, for calculating a sum of the absolute values of the first and the second outputs of the A/D converter; a first averager, for removing noise from the phase estimation signal; a second averager, for removing noise from the sum of the absolute values; and a look up table, for generating a phase difference in accordance with the phase estimation signal and the sum of the absolute values removed of noise.

According to the seventh aspect of the present invention, there is provided an optical coherent receiver using the digital phase estimator according to the second aspect of the present invention, which receiver comprises a local oscillator laser, for supplying a local oscillator optical signal; an optical 90 degree frequency mixer, for mixing a received optical signal with the local oscillator optical signal; first and second balancing photoelectric detectors, for converting the optical signals outputted from the optical 90 degree frequency mixer into baseband electrical signals; an A/D converter, for converting output signals from the first and the second balancing photoelectric detectors into digital signals; an argument calculator, for obtaining a phase of the digital signals; a phase estimating section, for obtaining a phase difference between a carrier signal of the received optical signal and the local oscillator optical signal; and a decoder, for subtracting the phase difference obtained by the phase estimating section from an output of the argument calculator to recover transmitted data; wherein the phase estimating section comprises the phase estimator according to the second aspect of the present invention, for generating a phase difference in accordance with the digital signals; and an averager, for removing noise from the phase difference.

The digital phase locked loop according to the present invention compensates the phase difference between the carrier signal and the local oscillator signal by means of the constellation rotator in the digital domain. In comparison with the solutions of the prior art, the present invention has the following notable advantages: the freely oscillating local oscillator laser avoids the difficulties in terms of the optical phase control; in comparison with the analog phase locked loop, the present invention is capable of tolerating greater phase noise; the advantages of the phase locked solution are retained, and it is therefore possible for application under the QAM modulation mode; and, the phase estimator is formed by subtracting and logical computations, thus reducing the difficulty in realization.

BRIEF DESCRIPTION OF THE DRAWINGS

The accompanying drawings included herein provide further understanding to the present invention, and they are incorporated into the Description and constitute a part thereof. The drawings describe the embodiments according to this invention, and explain the principle of this invention together with the Description. In the drawings.

FIG. 4-1 shows another example of the multiplier in the phase estimator as shown in FIG. 4;

FIG. 10-1 shows a modification of the optical coherent receiver according to the second embodiment of the present invention.

DETAILED DESCRIPTION

Embodiments of this invention are described in detail below with reference to the accompanying drawings.

Figure 3:
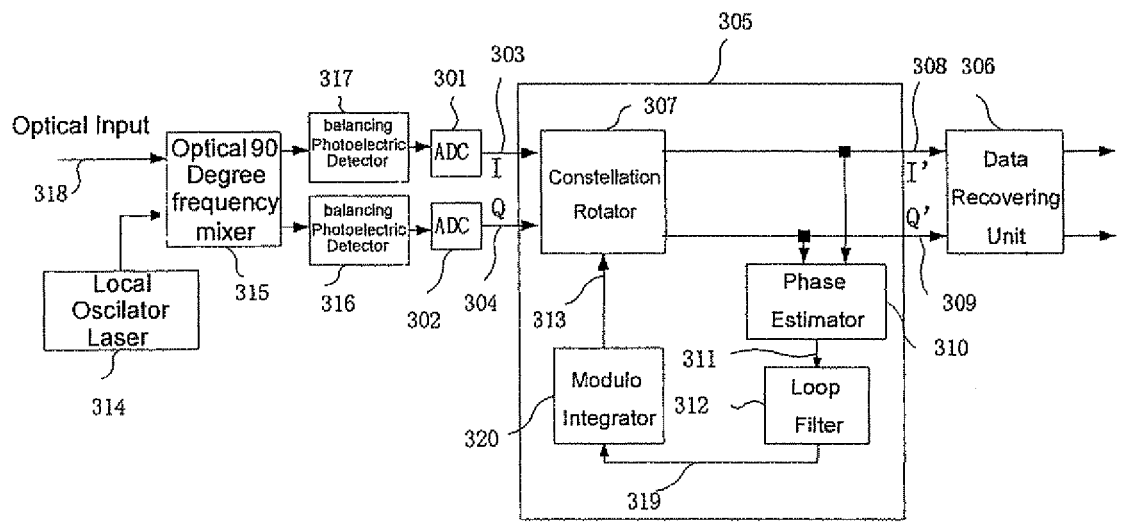
FIG. 3 shows an optical coherent receiver with a digital phase locked loop according to the first embodiment of the present invention.

FIG. 3 shows an overall structure of the optical coherent receiver with a digital phase locked loop according to the first embodiment of the present invention.

Figure 2:
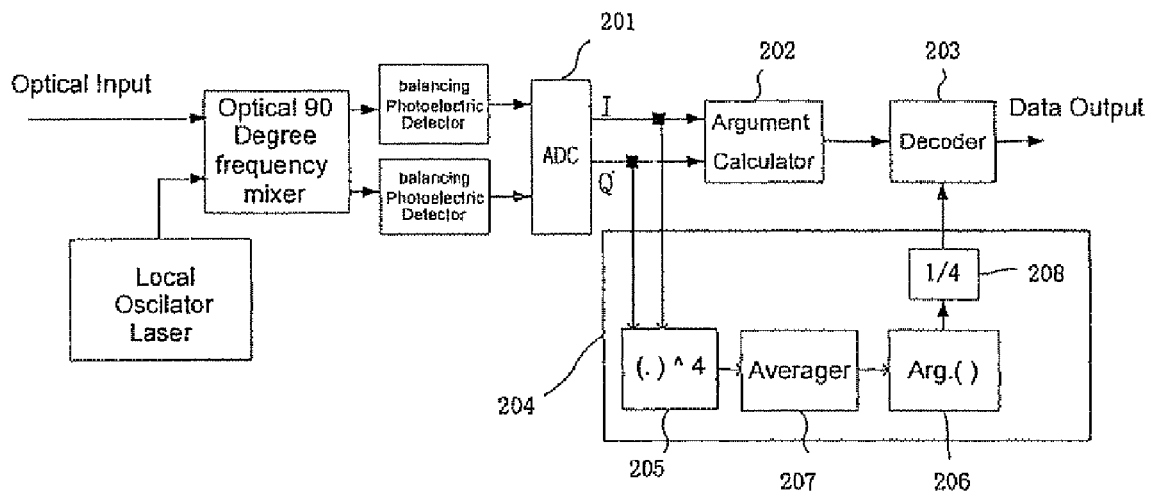
FIG. 2 shows a prior art digital optical coherent receiver employing the feed-forward phase estimation.

As shown in FIG. 3, similar to the prior art optical coherent receiver as shown in FIG. 2, the optical coherent receiver according to the first embodiment of this invention comprises a local oscillator laser 314 for supplying a local oscillator optical signal, an optical 90 degree frequency mixer 315 for mixing a received optical signal with the local oscillator optical signal, first and second balancing photoelectric detectors 316 and 317 for converting the optical signals outputted from the optical 90 degree frequency mixer 315 into baseband electrical signals, first and second A/D converters (ADC) 301 and 302 for respectively receiving output signals of the balancing photoelectric detectors 316 and 317 and respectively converting these output signals into digital signals, a digital phase locked loop 305 for compensating a phase difference between a carrier signal of the received optical signal and the local oscillator optical signal and outputting the compensated signal, and a data recovering unit 306 for recovering data from the compensated signal.

A first input terminal of the optical 90 degree frequency mixer 315 is connected to an optical input, a second input terminal thereof is connected to an output of the local oscillator laser 314, and first and second output terminals thereof are respectively connected to input terminals of the first and the second balancing photoelectric detectors 316 and 317; output terminals of the first and the second balancing photoelectric detectors 316 and 317 are respectively connected to input terminals of the first and the second A/D converters 301 and 302; output terminals of the first and the second A/D converters 301 and 302 are respectively connected to first and second input terminals of the digital phase locked loop 305; and first and second output terminals of the digital phase locked loop 305 are respectively connected to first and second input terminals of the data recovering unit 306.

Operation of the optical coherent receiver according to the first embodiment is explained in greater detail below.

Suppose the received optical signal 318 of the optical coherent receiver be:

$$s(t)\exp(j\omega t+j\phi_c(t)),$$

where s(t) is a complex envelop signal containing data information, and $\exp(j\omega t+j\phi_c(t))$ is a carrier with its angular frequency $\omega$ and phase noise $\phi_c(t)$.

The local oscillator optical signal outputted by the local oscillator laser 314 is:

$$\exp(j\omega_L t+j\phi_L(t)+j\phi_0),$$

where $\omega_L$ is the angular frequency of the local oscillator laser, $\phi_L(t)$ is the phase noise, and $\phi_0$ is the initial phase.

Similar to the prior art optical coherent receiver, the optical 90 degree frequency mixer 315 and the balancing photoelectric detectors 316 and 317 mix the received optical signal 318 with the local oscillator optical signal, and convert the same into a baseband electrical signal, which includes a cophase component I 303 and a quadrature component Q 304. The A/D converters 301 and 302 respectively convert the cophase component I 303 and the quadrature component Q 304 of this baseband electrical signal into digital signals. According to the publicly known theory of coherent communications (see, for instance, "*Digital Communications*, John G. Proakis, Fourth Edition McGraw-Hill, Inc"), the cophase signal I 303 and the quadrature signal Q 304 are:

$$\begin{aligned} I + jQ &= s(t)\exp[j(\omega t + \phi_c(t) - \omega_L(t) - \phi_L(t) - \phi_0)] \\ &= s(t)\exp[j\theta(t)] \end{aligned}$$

where $\theta(t)$ is the phase difference between the carrier signal of the received optical signal and the local oscillator signal. The phase difference can be caused by a frequency difference between the carrier signal and the local oscillator signal, and can also be the phase noise of the carrier signal or the local oscillator signal, or the initial phase of the local oscillator signal.

The frequency of the local oscillator laser in a prior art analog phase locked loop is automatically adjusted in accordance with the phase difference between the carrier signal and the local oscillator signal, so that the phase difference between the carrier signal and the local oscillator signal is substantially zero. However, in this invention the phase difference $\theta(t)$ between the carrier signal and the local oscillator signal is compensated by means of the digital phase locked loop 305

As shown in FIG. 3, digital phase locked loop 305 comprises, in sequential cascade connection, a phase estimator 310, a loop filter 312, a modulo integrator is 320 and a constellation rotator 307, so as to form a feedback loop, namely the digital phase locked loop of this invention. First and second input terminals of the constellation rotator 307 are respectively connected to output terminals of the first and the second A/D converters 301 and 302, first and second output terminals of the constellation rotator 307 are respectively connected to first and second input terminals of the data recovering unit 306, and also respectively connected to first and second input terminals of the phase estimator 310; an output terminal of the phase estimator 310 is connected to an input terminal of the loop filter 312; an output terminal of the loop filter 312 is connected to an input terminal of the modulo integrator 320; and an output terminal of the modulo integrator 320 is connected to a third input terminal of the constellation rotator 307.

The phase estimator 310 detects the phase difference between the carrier signal and the local oscillator signal, and outputs a phase estimation signal 311 to the loop filter 312. The loop filter 312 filters the phase estimation signal 311 to remove it of noise, and outputs its output 319 to the modulo integrator 320. The modulo integrator 320 generates a constellation rotation angle 313 in accordance with the output 319, and outputs the constellation rotation angle 313 to the constellation rotator 307. The constellation rotator 307 rotates an inputted signal in accordance with the constellation rotation angle to compensate the phase difference between the carrier signal and the local oscillator signal, and outputs the signal having undergone the constellation rotation.

Figure 1:
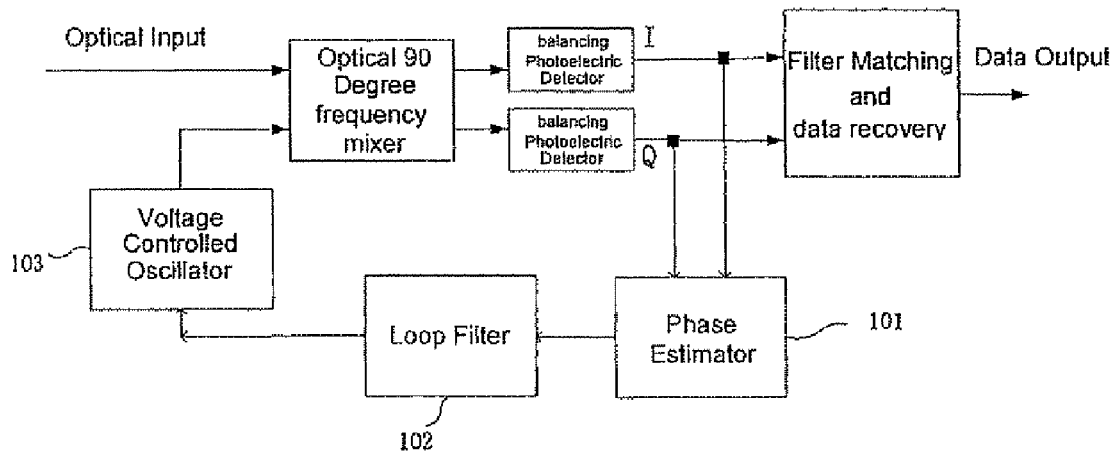
FIG. 1 shows a prior art optical coherent receiver employing an analog phase locked loop solution.

In comparison with the prior art analog phase locked loop as shown in FIG. 1, the phase estimator 310 corresponds to the phase estimator 101 in FIG. 1, the loop filter 312 corresponds to the loop filter 102 in FIG. 1, and the constellation rotator 307 and the modulo integrator 320 correspond to the voltage-controlled oscillator 103 in FIG. 1. Thus, when the digital phase locked loop continuously operates, there is no phase difference between its outputs 308 I' and 309 Q', that is to say, $$I'+jQ'=s(t)$$

As should be noted, the loop filter 312 shown in FIG. 3 filters to remove the phase estimation signal 311 of noise, and this loop filter 312 can be realized via publicly known technology, see, for instance, "*Digital Communications*, John G. Proakis, Fourth Edition McGraw-Hill, Inc". Accordingly, description thereto is omitted in this description.

Structures of each of the component parts of the digital phase locked loop 305 according to this invention are explained in detail in the following with reference to FIGS. 4-9.

The following description is made on the assumption that the QPSK modulation mode is employed in this invention, but, as should be noted, this invention is not restricted to the QPSK modulation mode, as other modulation modes, such as the 16-QAM etc., can also be applied thereto. Under the QPSK modulation mode, the baseband signal s(t) is one of the four values listed below:

$$\exp(j\pi/4), \exp(j3\pi/4), \exp(j5\pi/4), \exp(j7\pi/4),$$

or equivalently as:

$$1/\sqrt{2}(1+j), 1/\sqrt{2}(-1+j), 1/\sqrt{2}(-1-j), 1/\sqrt{2}(1-j).$$

Figures 1, 4:
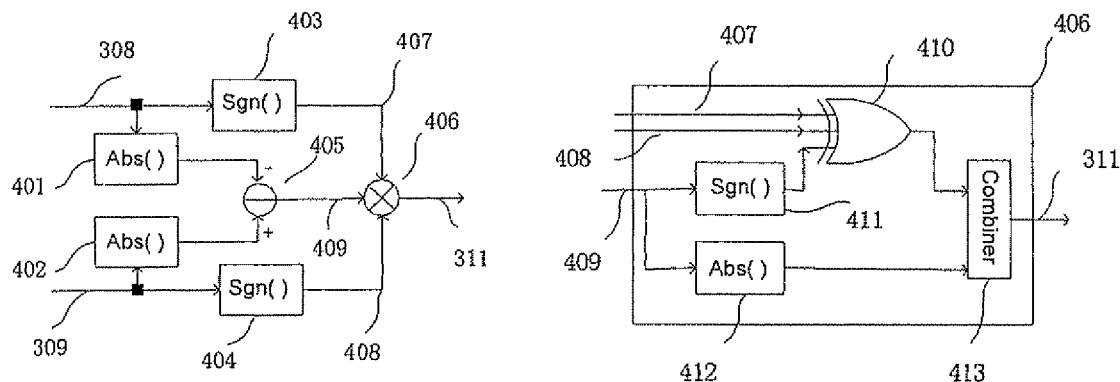
FIG. 4 shows a phase estimator, whose output is proportional to the phase difference, used in the digital phase locked loop according to the present invention.

FIG. 4 shows a phase estimator according to this invention. As shown in FIG. 4, the phase estimator according to this invention comprises first and second absolute value calculators 401 and 402 for respectively calculating absolute values of the inputted signals I' 308 and Q' 309, first and the second sign calculators 403 and 404 for respectively obtaining signs of the inputted signals I' 308 and Q' 309, a subtracter 405 for obtaining a difference between the absolute values of the inputted signals I' 308 and Q' 309, and a multiplier 406 for multiplying the difference between the absolute values of the inputted signals I' 308 and Q' 309 with the signs of the inputted signals I' 308 and Q' 309, and outputting the multiplying result as the phase estimation signal 311.

An input terminal of the first absolute value calculator 401 and an input terminal of the first sign calculator 403 are connected to a first external input, an output terminal of the first absolute value calculator 401 is connected to a negative input terminal of the subtracter 405, an input terminal of the second absolute value calculator 402 and an input terminal of the second sign calculator 404 are connected to a second external input, an output terminal of the second absolute value calculator 402 is connected to a positive input terminal of the subtracter 405, an output terminal of the subtracter 405 is connected to a third input terminal of the multiplier 406, output terminals of the first and the second sign calculators 403 and 404 are respectively connected to first and second input terminals of the multiplier 406, and an output terminal of the multiplier 406 is connected to an external output.

According to FIG. 4, suppose the inputted signals I'308 and Q'309 be:

$$I'+jQ'=s_n\exp(j\theta),$$

where $s_n$ is the data, and $\theta$ is the phase difference between the carrier signal and the local oscillator signal, then the phase estimation signal 311 outputted by the phase estimator is:

$$(|Q'|-|I'|)\times\text{sgn}(I')\times\text{sgn}(Q')=\sqrt{|I'|^2+|Q'|^2}\sqrt{2}\sin(\theta)$$

where $\sqrt{|I'|^2+|Q'|^2}$ indicates the power of signal; since the power of signal is usually a constant, and the phase difference $\theta$ is usually a very small value, the phase estimation signal outputted by the phase estimator is proportional to the phase difference, and the phase estimation signal provides not only the size of the phase difference but also the direction of the phase difference.

As can be known according to FIG. 3, the inputted signals I' 308 and Q' 309 are digital signals, the absolute value calculators 401 and 402 can hence be conveniently realized by a logical circuit, for instance, by directly discarding a sign bit of the digital signal. The sign calculators 403 and 404 can also be realized by a logical circuit, for instance, by directly getting the sign bit of the digital signal. The subtracter 405 can be realized by a known subtracter circuit.

Since outputs 407, 408 of the sign calculators 403 and 404 are always 1 or −1, the to 3-input multiplier 406 can also be realized by logical computation in addition to being embodied by a common numerical multiplier, as shown in FIG. 4-1. The multiplier comprises a sign calculator 411 for obtaining a sign of an output of the subtracter 405, an absolute value calculator 412 for obtaining an absolute value of the output of the subtracter 405, an exclusive-OR (XOR) calculator 410 for performing an exclusive-OR operation on outputs of the sign calculators 403, 404 and 411, and a combiner 413 for combining an output of the absolute value calculator 412 with an output of the exclusive-OR calculator 410.

An input terminal of the sign calculator 411 and an input terminal of the absolute value calculator 412 are connected to an external input, an output terminal of the sign calculator 411 is connected to a third input terminal of the exclusive-OR calculator 410, first and second input terminals of the exclusive-OR calculator 410 are respectively connected to first and second external inputs, an output terminal of the exclusive-OR calculator 410 is connected to a first input terminal of the combiner 413, and an output terminal of the absolute value calculator 412 is connected to a second input terminal of the combiner 413.

The absolute value calculator 412 calculates the absolute value of the output 409 of the subtracter 405 to obtain the absolute value of the multiplying result. The sign calculator 411 calculates a sign of the output 409, and outputs it to the exclusive-OR (XOR) calculator 410 to perform an exclusive-OR operation with inputs 407, 408, so as to obtain a sign of the multiplying result of the multiplier 406 shown in FIG. 4. After the absolute value and the sign of the multiplying result have been obtained, the combiner 413 combines the sign bit with the numerical values to obtain the multiplying result itself.

The aforementioned circuits can be realized by publicly known technologies, see, for instance, *Digital Circuits and Logical Design*, written and compiled by Shukun Wang and Huimin X U et al., Publishing House of the People's Posts and Communications. Of course, the above computations can also be realized by digital signal processing.

The output 311 of the phase estimator as shown in FIG. 4 is an amount proportional to the phase difference, but the phase estimator according to this invention is not restricted to the type shown in FIG. 4.

Figure 5:
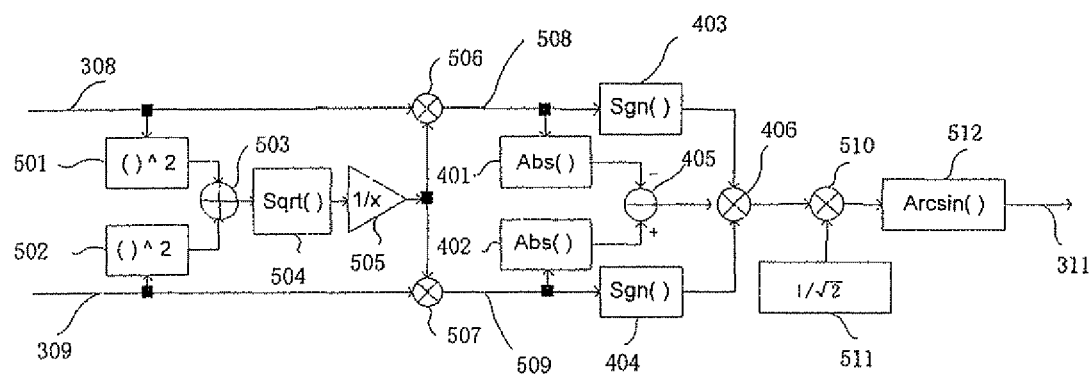
FIG. 5 shows another phase estimator, whose output is the phase difference itself, used in the digital phase locked loop according to the present invention.

FIG. 5 shows the structure of another phase estimator according to this invention. In contrast to the structure shown in FIG. 4, the phase estimator in FIG. 5 is added with a normalizing section to the input terminal of the phase estimator shown in FIG. 4, and the normalizing section comprises first and second square calculators 501 and 502 for respectively obtaining squares of the inputted signals I' 308 and Q' 309, an adder 503 for obtaining a summation of the squares of the inputted signals I' 308 and Q' 309, a square root calculator 504 for obtaining a square root of the summation of the squares of the inputted signals I' 308 and Q' 309, an inverse number calculator 505 for obtaining an inverse number of the square root, and first and second multipliers 506 and 507 for respectively multiplying the inputted signals I' 308 and Q' 309 with the inverse number of the square root.

An input terminal of the first square calculator 501 and a first input terminal of the first multiplier 506 are connected to a first external input, an output terminal of the first square calculator 501 is connected to a first input terminal of the adder 503, an input terminal of the second square calculator 502 and a first input terminal of the second multiplier 507 are connected to a second external input, an output terminal of the second square calculator 502 is connected to a second input terminal of the adder 503, an output terminal of the adder 503 is connected to an input terminal of the square root calculator 504, an output terminal of the square root calculator 504 is connected to an input terminal of the inverse number calculator 505, an output terminal of the inverse number calculator 505 is connected to a second input terminal of the first multiplier 506 and a second input terminal of the second multiplier 507, and output terminals of the first multiplier 506 and the second multiplier 507 are respectively connected to the first and the second external inputs of the phase estimator as shown in FIG. 4.

The normalizing section changes the inputted signals I' 308 and Q' 309 into normalized signals $I'/\sqrt{I'^2+Q'^2}$ 508 and $Q'/\sqrt{I'^2+Q'^2}$ 509, so that the signal powers of the normalized signals 508 and 509 are always 1.

In addition, the phase estimator as shown in FIG. 5 is further added with a phase difference calculating section to the output terminal of the phase estimator shown in FIG. 4, and the phase difference calculating section comprises a $1/\sqrt{2}$ calculator 511 for outputting a value of $1/\sqrt{2}$; a multiplier 510 for multiplying an output of an intermediate stage of the phase estimator in FIG. 5 (having the same structure as the phase estimator in FIG. 4) with an output of the $1/\sqrt{2}$ calculator 511 and outputting the multiplying result; and an arcsine calculator 512 for performing an arcsine operation on an output of the multiplier 510 to obtain a phase difference.

A first input terminal of the multiplier 510 is connected to the external output of the phase estimator in FIG. 4, a second input terminal of the multiplier 510 is connected to an output terminal of the $1/\sqrt{2}$ calculator 511, an output terminal of the multiplier 510 is connected to an input terminal of the arcsine calculator 512, and an output terminal of the arcsine calculator 512 is connected to an external output.

As can be known from the above description with reference to FIG. 4, output of the intermediate stage (namely the output of the multiplier 406) of the phase estimator shown in FIG. 5 is $\sqrt{2}\sin(\theta)$. Subsequently, this output is first multiplied with $1/\sqrt{2}$ in the phase difference calculating section of the phase estimator in FIG. 5, and an arcsine operation a sin is then performed thereon. Thus, the output 311 of the phase estimator in FIG. 5 is the phase difference θ itself, rather than an amount proportional to the phase difference.

The circuits of each of the units in FIG. 5 can be realized by means of known technology, see, for instance, *Digital Circuits and Logical Design*, written and compiled by Shukun Wang and Huimin X U, Publishing House of the People's Posts and Communications. In addition, the square root calculator and the arcsine calculator in FIG. 5 can be realized via a look up table (LUT). Of course, the above computations can also be realized by digital signal processing.

Figure 6:
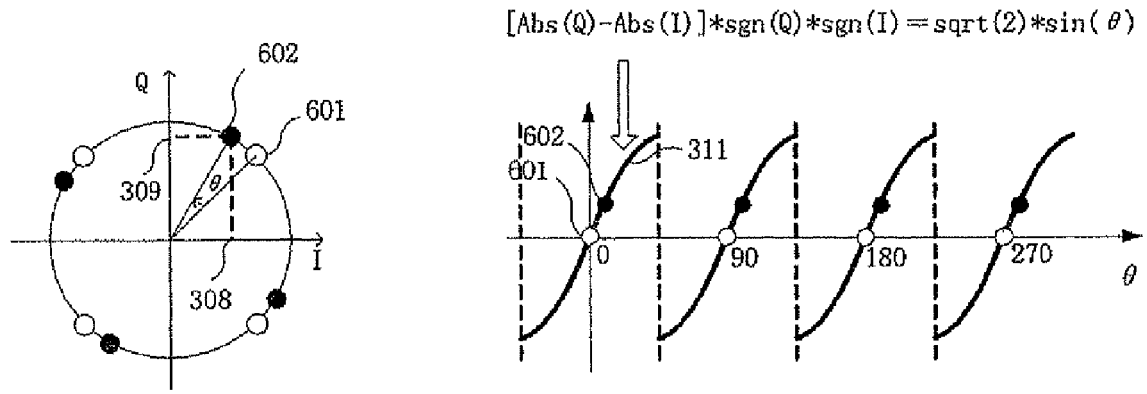
FIG. 6 shows a constellation (with or without phase difference) under the QPSK modulation mode, and shows the relationship of variations of the phase estimation signal of the phase estimator in accordance with the phase difference.

FIG. 6 shows, under the QPSK modulation mode, a constellation 601 without phase difference and a constellation 602 with phase difference, as well as the relationship between the output signal 311 of the phase estimator and the phase difference θ. As can be seen from FIG. 6, it is impossible to discern whether the phase difference is 0 degree, 90 degrees, 180 degrees or 270 degrees. This is called 90-degree fuzziness. This problem can be solved by publicly known methods, see, for instance, *Principles of Contemporary Communications*, by Zhigang CAO and Yasheng QIAN, Publishing House of Tsinghua University. The solution to this problem is omitted in the present Description.

Figure 7:
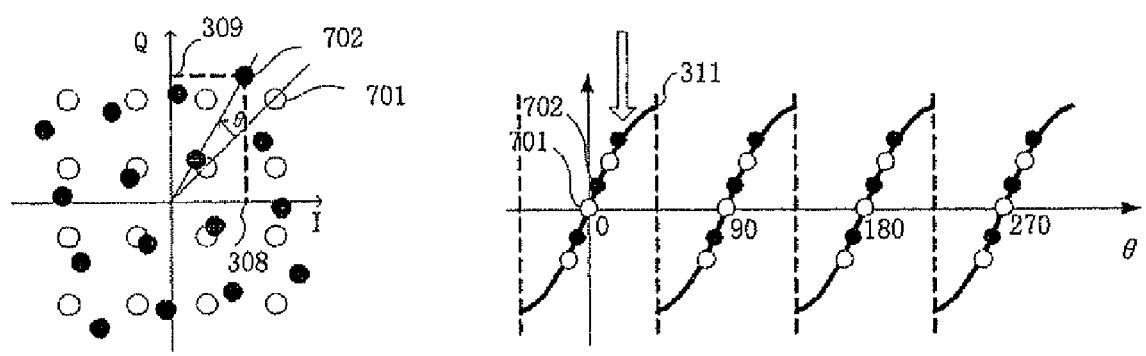
FIG. 7 shows a constellation (with or without phase difference) under the 16-QAM modulation mode, and shows the relationship of variations of the phase estimation signal of the phase estimator in accordance with the phase difference.

FIG. 7 shows, under the 16-QAM modulation mode, a constellation 701 without phase difference and a constellation 702 with phase difference, as well as the relationship between the output signal 311 of the phase estimator and the phase difference θ. As shown in FIG. 7, unlike the QPSK modulation mode in FIG. 6, the output 311 of the phase estimator is not always zero even if there is no phase difference, and its specific value depends on the data as transmitted. However, as can be seen from FIG. 7, since the value of the output 311 of the phase estimator is positive-negative symmetric, its average value is zero; the loop filter 312 in the phase locked loop has the function to average. If the phase difference is not zero, the output 311 of the phase estimator will deviate entirely along one direction, and its average value will not be zero. Therefore, the output 319 of the loop filter is proportional to the phase difference.

According to the optical coherent receiver as shown in FIG. 3, the output 311 of the phase estimator 310 is inputted to the loop filter 312, the output 319 having been removed of noise by the loop filter 312 is inputted to the modulo integrator 320, and the modulo integrator 320 generates the constellation rotation angle 313 and outputs the constellation rotation angle 313 to the constellation rotator 307.

Figure 8:
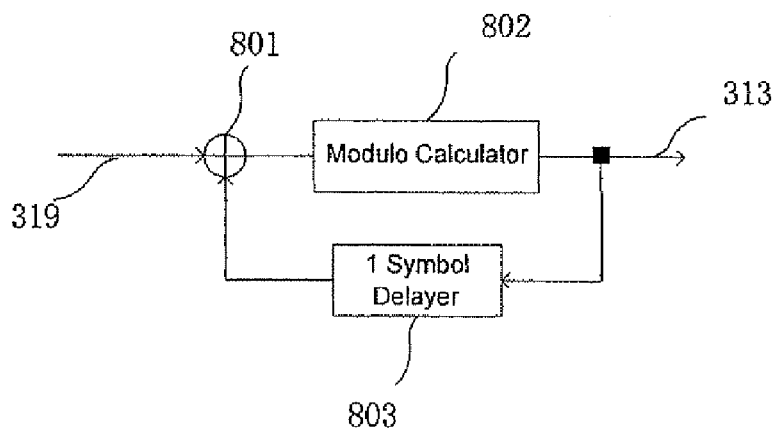
FIG. 8 shows an integrator having modulo calculation function according to the present invention.

FIG. 8 shows the structure of the modulo integrator 320 according to this invention. The modulo integrator 320 is similar to a voltage-controlled oscillator in a common analog phase locked loop. The modulo integrator 320 comprises an adder 801, a modulo calculator 802 for performing modulo 2π operation Mod(x, 2π) on an to output of the adder 801, and a 1 symbol delayer 803 for delaying an output of the modulo calculator 802 by one symbol and outputting it to the adder 801.

A first input terminal of the adder 801 is connected to an external input, a second input terminal of the adder 801 is connected to an output terminal of the 1 symbol delayer 803, an output terminal of the adder 801 is connected to an input terminal of the modulo calculator 802, and an output terminal of the modulo calculator 802 is connected to an external output and an input terminal of the 1 symbol delayer 803.

The adder 801 performs adding operations on the input 319 and the output of the 1 symbol delayer 803, and generates an output. A conventional integrator does not include the modulo calculator 802. In this invention the output 313 of the modulo integrator 302 is a constellation rotation angle; since the constellation rotation angle takes 2π as its own period, the 2π modulo calculation does not affect its correctness. This brings about the advantage of preventing the output 313 of the modulo integrator 320 from tending to be infinite. When there is a frequency difference between the carrier signal and the local oscillator signal, it sometimes occurs that the output 313 tends to be infinite. Specific realization of each of the aforementioned parts is publicly known in the art. Of courser the above computations can also be realized by digital signal processing.

Figure 9:
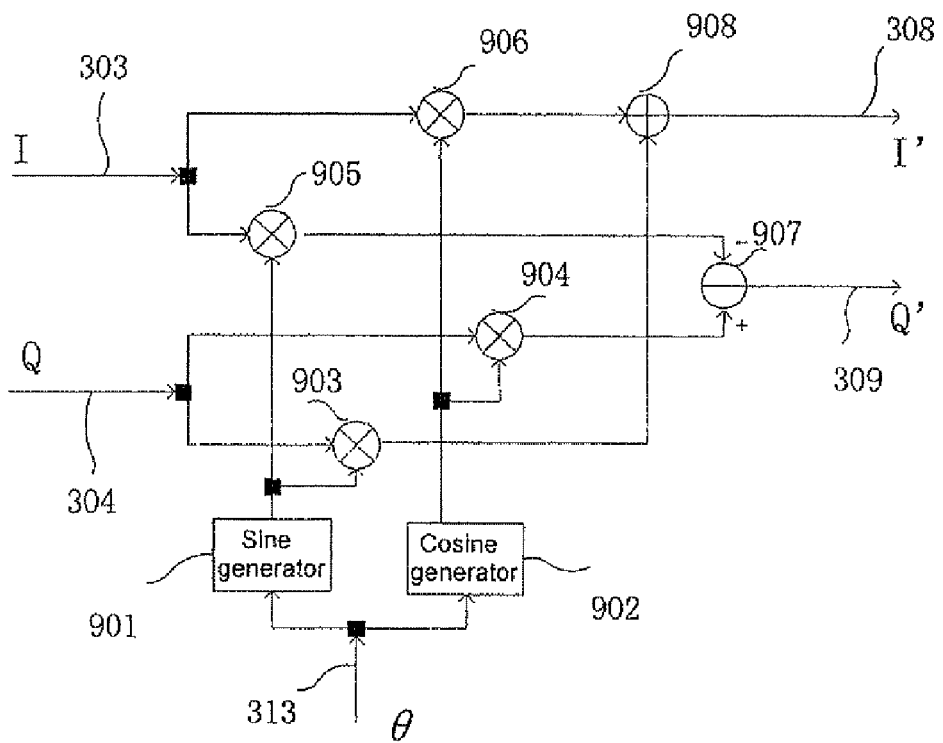
FIG. 9 shows the structure of a constellation rotator according to the present invention.

FIG. 9 shows the structure of the constellation rotator 307 according to this invention. The constellation rotator 307 has three inputs, namely a cophase signal I 303 and a quadrature signal 304 Q (a signal with phase difference) before constellation, and a constellation rotation angle θ 313. The constellation rotator 307 comprises a sine generator 901 for generating a sine value of the constellation rotation angle θ, a cosine generator 902 for generating a cosine value of the constellation rotation angle θ, a first multiplier 903 for multiplying an output of the sine generator 901 with the quadrature signal 304 Q and outputting the multiplying result, a second multiplier 904 for multiplying an output of the cosine generator 902 with the quadrature signal 304 Q and outputting the multiplying result, a third multiplier 905 for multiplying an output of the sine generator 901 with the cophase signal I 303 and outputting the multiplying result, a fourth multiplier 906 for multiplying an output of the cosine generator 902 with the cophase signal I 303 and outputting the multiplying result, a subtracter 907 for calculating a difference of subtracting an output of the third multiplier 905 from an output of the second multiplier 904 and outputting the result as an output Q' 309 of the constellation rotator 307, and an adder 908 for calculating a sum of an output of the first multiplier 903 and an output of the fourth multiplier 906 and outputting the result as an output I' 308 of the constellation rotator 307.

As shown in FIG. 9, an input terminal of the sine generator 901 and an input terminal of the cosine generator 902 are connected to a third external input, an output terminal of the sine generator 901 is connected to a second input terminal of the first multiplier 903 and a second input terminal of the third multiplier 905, a first input terminal of the first multiplier 903 is connected to a second external input, a first input terminal of the third multiplier 905 is connected to a first external input, an output terminal of the cosine generator 902 is connected to a second input terminal of the second multiplier 904 and a second input terminal of the fourth multiplier 906, a first input terminal of the second multiplier 904 is connected to a second external input, a first input terminal of the fourth multiplier 906 is connected to a first external input, an output terminal of the first multiplier 903 is connected to a second input terminal of the adder 908, an output terminal of the fourth multiplier 906 is connected to a first input terminal of the adder 908, an output terminal of the second multiplier 904 is connected to a positive input terminal of the subtracter 907, an output terminal of the third multiplier 905 is connected to a negative input terminal of the subtracter 907, an output terminal of the adder 908 is connected to a first external output, and an output terminal of the subtracter 907 is connected to a second external output.

According to the structure shown in FIG. 9, the outputs I' 308 and Q' 309 of the constellation rotator 307 are:

$$\begin{bmatrix} I' \\ Q' \end{bmatrix} = \begin{bmatrix} \cos(\theta) & \sin(\theta) \\ -\sin(\theta) & \cos(\theta) \end{bmatrix} \begin{bmatrix} I \\ Q \end{bmatrix}$$

As can be seen, the constellation rotator 307 rotates the inputted signal I+jQ by the angle θ. Matrix elements sin(θ) and cos(θ) in the rotation matrix are realized by the sine generator 901 and the cosine generator 902. Matrix calculation is realized through the first to the fourth multipliers 903-906, the subtracter 907 and the adder 908. Each of the units in FIG. 9 can be realized by means of known technology, for instance, the sine generator 901 and the cosine generator 902 can be realized via a look up table. Of course, the above computations can also be realized by digital signal processing.

The above description is directed to the first embodiment of the present invention. In the optical coherent receiver according to the first embodiment of the present invention, a digital phase locked loop is used to compensate the phase difference between the carrier signal and the local oscillator signal, and a phase estimator according to this invention is used in this digital phase locked loop. However, this invention is not restricted to the first embodiment, as it is also possible to use the phase estimator according to the first embodiment of this invention in an optical coherent receiver based on feed-forward phase estimation.

Figure 10:
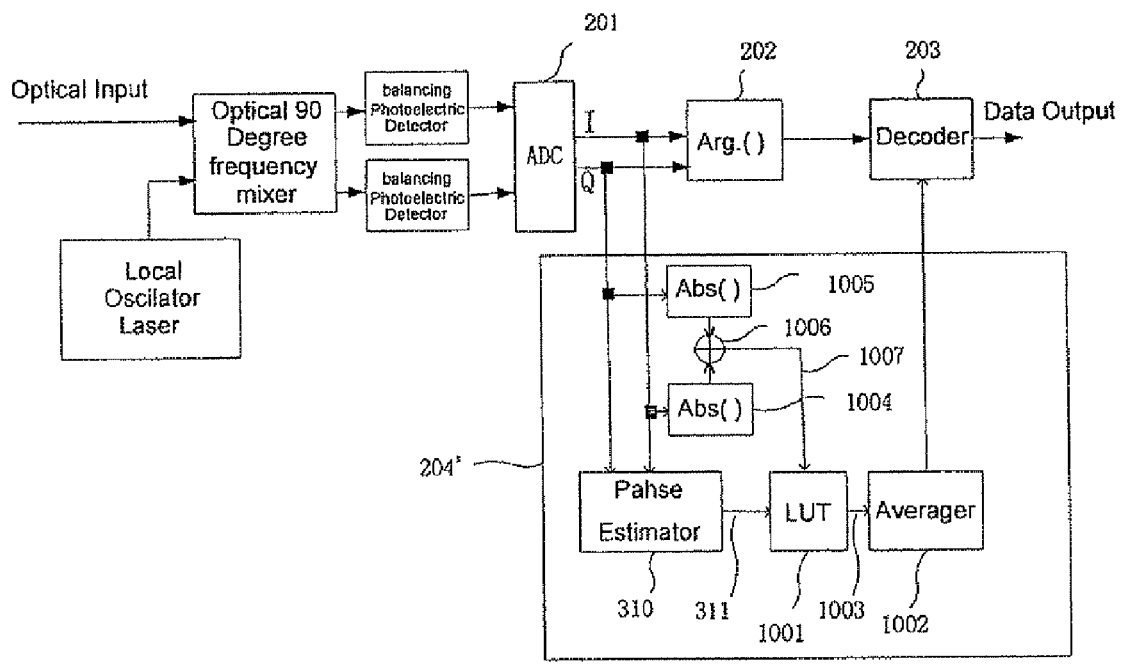
FIG. 10 shows an optical coherent receiver according to the second embodiment of the present invention using feed-forward phase estimation of the phase estimator as shown in FIG. 4.
Figures 1, 10:
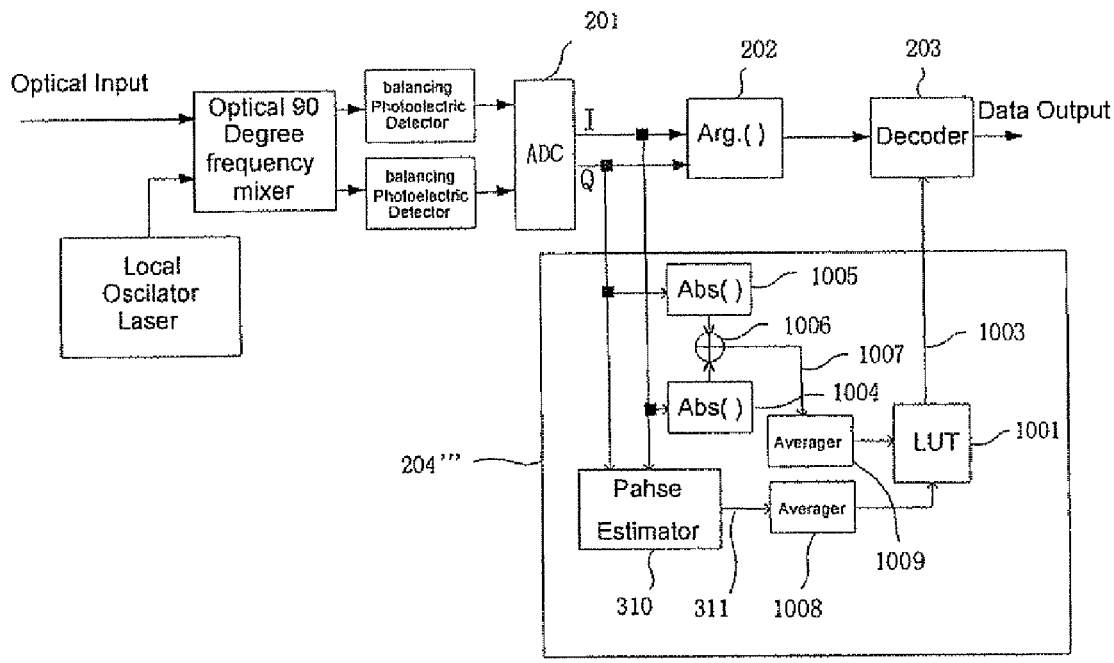

FIG. 10 shows the structure of an optical coherent receiver based on feed-forward phase estimation according to the second embodiment of the present invention using a phase estimator as shown in FIG. 4.

Except that the phase estimator 204 as shown in FIG. 2 is replaced with a phase estimating section 204', the optical coherent receiver as shown in FIG. 10 is the same as that shown in FIG. 2 in terms of the basic structure. The phase estimating section 204' comprises the phase estimator 310 as shown in FIG. 4 for generating the phase estimation signal 311 in accordance with the inputted signal I+jQ, first and second absolute value calculators 1004 and 1004 for respectively calculating the absolute values of the inputs I and Q, an adder 1006 for calculating a summation 1007 of the absolute values of the inputs I and Q, a look up table 1001 for generating a phase difference 1003 in accordance with the phase estimation signal 311 and the summation of the absolute values of the inputs I and Q, and an averager 1002 for removing the phase difference 1003 of noise.

First and second input terminals of the phase estimator 310 are respectively connected to first and second output terminals of the analog to digital converter 201, an output terminal of the phase estimator 310 is connected to a first input terminal of the look up table 1001, an input terminal of the first absolute value calculator 1004 is connected to a first output terminal of the analog to digital converter 201, an output terminal of the first absolute value calculator 1004 is connected to a first input terminal of the adder 1006, an input terminal of the second absolute value calculator 1005 is connected to a second output terminal of the analog to digital converter 201, an output terminal of the second absolute value calculator 1005 is connected to a second input terminal of the adder 1006, an output terminal of the adder 1006 is connected to a second input terminal of the look up table 1001, an output terminal of the look up table 1001 is connected to an input terminal of the averager 1002, and an output terminal of the averager 1002 is connected to a second input terminal of the decoder 203.

Since the output of the phase estimator 310 in FIG. 4 is an amount proportional to the phase difference, it is hence required that the output of the phase estimating section 204' be the phase difference itself so that such a conversion is realized by means of the absolute value calculators 1004 and 1005, the adder 1006, the look up table 1001 and the averager 1002. According to the description made with reference to FIG. 4, the output 311 of the phase estimator 310 is:

$$(|Q|-|I|) \times \text{sgn}(I) \times \text{sgn}(Q) = \sqrt{|I|^2+|Q|^2} \sqrt{2} \sin(\theta),$$

According to FIG. 10, the output 1007 of the adder 1006 is:

$$(|Q|+|I|) = \sqrt{|I|^2+|Q|^2} \sqrt{2} \cos(\theta),$$

The look up table 1001 restores the phase difference θ in accordance with the output 311 of the phase estimator 310 and the output 1007 of the adder 1006, that is to say, the loop up table 1001 carries out the following mathematical operation:

$$\theta = \arctan\left(\frac{\sqrt{|I|^2+|Q|^2} \sqrt{2} \sin(\theta)}{\sqrt{|I|^2+|Q|^2} \sqrt{2} \cos(\theta)}\right).$$

The averager 1002 removes the phase difference 1003 of noise to acquire a more precise phase difference, and then outputs the phase difference 1003 to the decoder 203.

In the second embodiment as shown in FIG. 10, the noise is removed after the phase difference has been obtained through the look up table, but this invention is not restricted to such a structure, as it is also possible to obtain the phase difference through the look up table after the noise has been removed, as shown in FIG. 10-1, which shows a modification of the optical coherent receiver shown in FIG. 10.

Except that a first averager 1008 and a second averager 1009 are respectively connected to first and second input terminals of the look up table 1001, rather than to the output terminal of the look up table 1001, the optical coherent receiver shown in FIG. 10-1 is the same as that shown in FIG. 10 in terms of structure, and the same parts are hence omitted for description here.

In FIG. 10-1, an input terminal of the first averager 1008 is connected to an output terminal of the phase estimator 310, an output terminal of the first averager 1008 is connected to a first input terminal of the look up table 1001, an input terminal of the second averager 1009 is connected to an output terminal of the adder 1006, an output terminal of the second averager 1009 is connected to a second input terminal of the look up table 1001, and an output terminal of the look up table 1001 is connected a second input terminal of the decoder 203.

Figure 11:
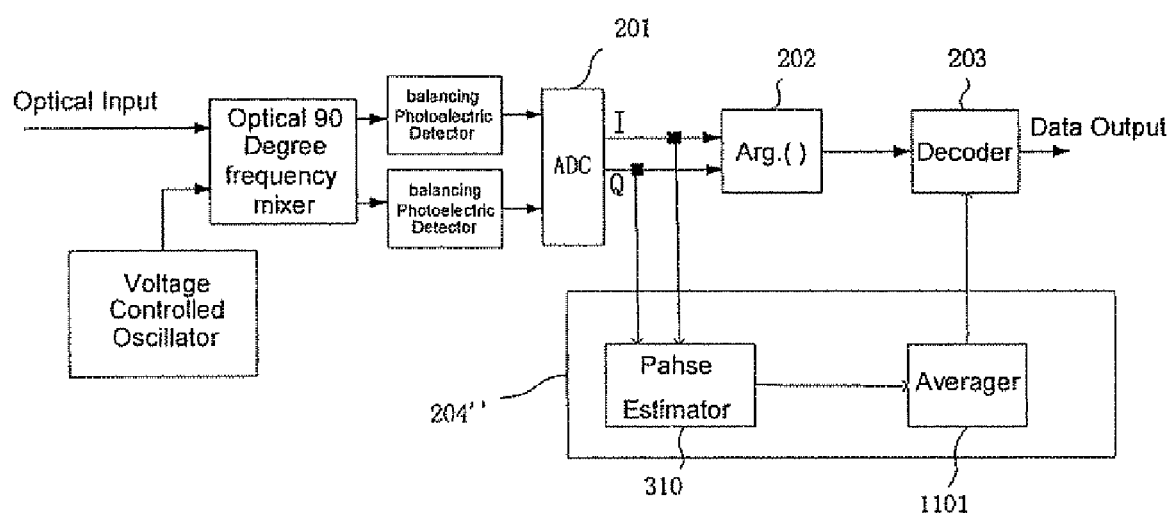
FIG. 11 shows an optical coherent receiver according to the third embodiment of the present invention using feedforward phase estimation of the phase estimator as shown in FIG. 5.

FIG. 11 shows the structure of an optical coherent receiver based on feed-forward phase estimation according to the third embodiment of the present invention using a phase estimator as shown in FIG. 5.

Except that the phase estimator 204 as shown in FIG. 2 is replaced with a phase estimating section 204", the optical coherent receiver as shown in FIG. 11 is the same as that shown in FIG. 2 in terms of the basic structure. The phase estimating section 204" comprises the phase estimator 310 as shown in FIG. 5 for generating a phase difference in accordance with the inputted signal I+jQ, and an averager 1101 for removing the phase difference of noise. First and second input terminals of the phase estimator 310 are respectively connected to first and second output terminals of the analog to digital converter 210, an output terminal of the phase estimator 310 is connected to an input terminal of the averager 1101' and an output terminal of the averager 1101 is connected to a second input terminal of the decoder 203.

According to the description made with reference to FIG. 5, the output 311 of the phase estimator 310 is the phase difference itself, so that a more precise phase difference can be obtained merely by means of the averager 11011 and the phase difference is subsequently outputted to the decoder 203.

Explanations are made in the above description with regard to the optical coherent receiver based on the digital phase locked loop and using the digital phase estimator according to this invention as well as the optical coherent receiver based on feed-forward phase estimation. According to this invention, the digital phase locked loop compensates the phase difference between the carrier signal and the local oscillator signal by means of the constellation rotator and the local oscillator signal is freely oscillating, thus retaining the advantages of the phase locked loop solution while avoiding the difficulties in phase control of the local oscillator laser. Moreover, the phase estimator according to this invention provides the size and direction of the phase difference through a simple method, thus reducing the difficulties in implementation.

Although the present invention is explained with examples of the QPSK and QAM modulation solutions, application of the present invention is not limited thereto, as it is also possible for application in conventional coherent systems.

It would be easy for persons skilled in the art, based on the explanations to the principles of the present invention as detailed above, to conceive of various variations and modified embodiments of the present invention. Consequently, the present invention is not restricted to the specific embodiments as disclosed herein, but covers all variations and modified embodiments of this invention insofar as they fall within the scopes claimed in the Claims as attached.

The invention claimed is:

1. A digital phase estimator for generating a phase estimation signal, comprising:
   a first absolute value calculator, for calculating an absolute value of a first input signal;
   a second absolute value calculator, for calculating an absolute value of a second input signal;
   a first sign calculator, for obtaining a sign of the first input signal;
   a second sign calculator, for obtaining a sign of the second input signal;
   a subtracter, for obtaining a difference of subtracting the absolute value of the first input signal from the absolute value of the second input signal; and
   a first multiplier (406), for multiplying the difference between the absolute values of the first input signal and the second input signal with the signs of the first input signal and the second input signal, and outputting the multiplying result as the phase estimation signal;
   wherein an input terminal of the first absolute value calculator and an input terminal of the first sign calculator are connected to a first external input; an output terminal of the first absolute value calculator is connected to a negative input terminal of the subtracter; an input terminal of the second absolute value calculator and an input terminal of the second sign calculator are connected to a second external input; an output terminal of the second absolute value calculator is connected to a positive input terminal of the subtracter; an output terminal of the subtracter is connected to a third input terminal of the first multiplier (406); output terminals of the first and the second sign calculators are respectively connected to a first and a second input terminals of the first multiplier (406); and an output terminal of the first multiplier (406) is connected to an external output.

2. The digital phase estimator according to claim 1, wherein the first multiplier (406) comprises:
   a third sign calculator, for obtaining a sign of the output from the subtracter;
   a third absolute value calculator, for obtaining an absolute value of output from the subtracter;
   an exclusive-OR calculator, for performing exclusive-OR operation on outputs of the first, the second and the third sign calculators; and
   a combiner, for combining an output of the third absolute value calculator and an output of the exclusive-OR calculator to obtain the multiplying result;
   wherein an input terminal of the third sign calculator and an input terminal of the third absolute value calculator are connected to the output terminal of the subtracter; an output terminal of the third sign calculator is connected to a third input terminal of the exclusive-OR calculator; a first and a second input terminals of the exclusive-OR calculator are respectively connected to the output terminals of the first and the second sign calculators; an output terminal of the exclusive-OR calculator is connected to a first input terminal of the combiner; and an output terminal of the third absolute value calculator is connected to a second input terminal of the combiner.

3. The digital phase estimator according to claim 1 or 2, further comprising:
   a normalizing section, for normalizing the first input signal and the second input signal; said normalizing section comprising:
   a first square calculator, for obtaining a square of the first input signal;
   a second square calculator, for obtaining a square of the second input signal;
   an adder, for obtaining a summation of the square of the first input signal and the square of the second input signal;
   a square root calculator, for obtaining a square root of the summation;
   an inverse number calculator, for calculating an inverse number of the square root;
   a second multiplier (506), for multiplying the inverse number with the first input signal; and
   a third multiplier (507), for multiplying the inverse number with the second input signal;
   wherein an input terminal of the first square calculator and a first input terminal of the second multiplier (506) are connected to the first external input; an output terminal of the first square calculator is connected to a first input terminal of the adder; an input terminal of the second square calculator and a first input terminal of the third multiplier (507) are connected to a second external input; an output terminal of the second square calculator is connected to a second input terminal of the adder; an output terminal of the adder is connected to an input terminal of the square root calculator; an output terminal of the square root calculator is connected to an input terminal of the inverse number calculator; an output terminal of the inverse number calculator is connected to a second input terminal of the second multiplier (506) and a second input terminal of the third multiplier (507); output terminals of the second multiplier (506) and the third multiplier (507) are respectively connected to the input terminals of the first absolute value calculator and the second absolute value calculator, and are respectively connected to the input terminals of the first sign calculator and the second sign calculator.

4. The digital phase estimator according to claim 3, further comprising:
a phase difference calculating section, for calculating a phase difference in accordance with an output of the first multiplier (406), said phase difference calculating section comprising:
a $1/\sqrt{2}$ calculator, for calculating a value of $1/\sqrt{2}$;
a fourth multiplier (510), for multiplying the output of the first multiplier (406) with an output of the $1/\sqrt{2}$ calculator, and outputting the multiplying result; and
an arcsine calculator, for performing an arcsine operation on an output of the fourth multiplier (510) to obtain a phase difference;
wherein a first input terminal of the fourth multiplier (510) is connected to an output terminal of the first multiplier (406); a second input terminal of the fourth multiplier (510) is connected to an output terminal of the $1/\sqrt{2}$ calculator; an output terminal of the fourth multiplier (510) is connected to an input terminal of the arcsine calculator; and an output terminal of the arcsine calculator is connected to the external output.

5. An optical coherent receiver, comprising:
a local oscillator laser, for supplying a local oscillator optical signal;
an optical 90 degree frequency mixer, for mixing a received optical signal with the local oscillator optical signal;
first and second balancing photoelectric detectors, for converting the optical signals outputted from the optical 90 degree frequency mixer into baseband electrical signals;
a A/D converter, for converting output signals from the first and the second balancing photoelectric detectors into digital signals;
an argument calculator, for obtaining a phase of the digital signals;
a phase estimating section, for obtaining a phase difference between a carrier signal of the received optical signal and the local oscillator optical signal; and
a decoder, for subtracting the phase difference obtained by the phase estimating section from an output of the argument calculator to recover transmitted data;
wherein a first input terminal of the optical 90 degree frequency mixer is connected to the external input; a second input terminal of the optical 90 degree frequency mixer is connected to an output of the local oscillator laser; a first output terminal and a second output terminal of the optical 90 degree frequency mixer are respectively connected to input terminals of the first and the second balancing photoelectric detectors; output terminals of the first and the second balancing photoelectric detectors are respectively connected to first and second input terminals of the A/D converter; first and second output terminals of the A/D converter are respectively connected to first and second input terminals of the phase estimating section and first and second input terminals of the argument calculator; an output terminal of the argument calculator is connected to a first input terminal of the decoder; and an output terminal of the phase estimating section is connected to a second input terminal of the decoder;
and wherein said phase estimating section comprising:
the phase estimator according to claim 4, for generating a phase difference in accordance with the digital signals; and
an averager, for removing noise from the phase difference;
wherein a first and a second input terminals of the phase estimator are respectively connected to a first and a second output terminals of the A/D converter; an output terminal of the phase estimator is connected to an input terminal of the averager; and an output terminal of the averager is connected to a second input terminal of the decoder.

6. A digital phase locked loop, comprising:
the phase estimator according to any one of claims 1-4, for detecting a phase difference between a carrier signal of an input signal and a local oscillator signal, and outputting a phase estimation signal;
a loop filter, for filtering the phase estimation signal to remove noise;
a modulo integrator, for generating a constellation rotation angle in accordance with the phase estimation signal outputted by the loop filter and removed of noise, and outputting the constellation rotation angle; and
a constellation rotator, for rotating the input signal in accordance with the constellation rotation angle to compensate the phase difference between the carrier signal and the local oscillator signal, and outputting the signal having undergone constellation rotation;
wherein a first input terminal and a second input terminal of the constellation rotator are respectively connected to the first and the second external inputs; a first output terminal and a second output terminal of the constellation rotator are respectively connected to a first and a second external outputs, and are further respectively connected to a first and a second input terminals of the phase estimator; an output terminal of the phase estimator is connected to an input terminal of the loop filter; an output terminal of the loop filter is connected to an input terminal of the modulo integrator; and an output terminal of the modulo integrator is connected to a third input terminal of the constellation rotator.

7. The digital phase locked loop according to claim 6, wherein the modulo integrator comprises:
an adder;
a modulo $2\pi$ calculator, for performing modulo $2\pi$ operation on an output of the adder; and
a 1 symbol delayer, for delaying an output of the modulo $2\pi$ calculator for one symbol, and outputting it to the adder;
wherein a first input terminal of the adder is connected to the external input; a second input terminal of the adder is connected to an output terminal of the 1 symbol delayer; an output terminal of the adder is connected to an input terminal of the modulo $2\pi$ calculator; and an output terminal of the modulo $2\pi$ calculator is connected to the external output and an input terminal of the 1 symbol delayer.

8. The digital phase locked loop according to claim 6, wherein the constellation rotator comprises:
a sine generator, for generating a sine value of the inputted constellation rotation angle;
a cosine generator, for generating a cosine value of the constellation rotation angle;
a first multiplier, for multiplying an output of the sine generator with the inputted second input signal, and outputting the multiplying result;
a second multiplier, for multiplying an output of the cosine generator with the second input signal, and outputting the multiplying result;
a third multiplier, for multiplying an output of the sine generator with the inputted first input signal, and outputting the multiplying result;

a fourth multiplier, for multiplying an output of the cosine generator with the first input signal, and outputting the multiplying result;

a subtracter, for calculating a difference of subtracting an output of the third multiplier from an output of the second multiplier, and outputting the result; and an adder, for calculating a sum of an output of the first multiplier and an output of the fourth multiplier, and outputting the result;

wherein an input terminal of the sine generator and an input terminal of the cosine generator are connected to a third external input; an output terminal of the sine generator is connected to a second input terminal of the first multiplier and a second input terminal of the third multiplier; a first input terminal of the first multiplier is connected to the second external input; a first input terminal of the third multiplier is connected to the first external input; an output terminal of the cosine generator is connected to a second input terminal of the second multiplier and a second input terminal of the fourth multiplier; a first input terminal of the second multiplier is connected to the second external input; a first input terminal of the fourth multiplier is connected to the first external input; an output terminal of the first multiplier is connected to a second input terminal of the adder; an output terminal of the fourth multiplier is connected to a first input terminal of the adder; an output terminal of the second multiplier is connected to a positive input terminal of the subtracter; an output terminal of the third multiplier is connected to a negative input terminal of the subtracter; an output terminal of the adder is connected to the first external output; and an output terminal of the subtracter is connected to the second external output.

9. An optical coherent receiver, comprising:

a local oscillator laser, for supplying a local oscillator optical signal;

an optical 90 degree frequency mixer, for mixing a received optical signal with the local oscillator optical signal;

first and second balancing photoelectric detectors, for converting the optical signals outputted from the optical 90 degree frequency mixer into baseband electrical signals;

first and second A/D converters, for respectively converting output signals from the first and the second balancing photoelectric detectors into digital signals;

the digital phase locked loop according to any one of claims 6-8, for compensating a phase difference between a carrier signal of the received optical signal and the local oscillator optical signal, and outputting the compensated signal; and a data recovering unit, for recovering data from the compensated signal;

wherein a first input terminal of the optical 90 degree frequency mixer is connected to the external input; a second input terminal of the optical 90 degree frequency mixer is connected to an output of the local oscillator laser; a first output terminal and a second output terminal of the optical 90 degree frequency mixer are respectively connected to input terminals of the first and the second balancing photoelectric detectors; output terminals of the first and the second balancing photoelectric detectors are respectively connected to input terminals of the first and the second A/D converters; output terminals of the first and the second A/D converters are respectively connected to first and second input terminals of the digital phase locked loop; and first and second output terminals of the digital phase locked loop are respectively connected to first and second input terminals of the data recovering unit.

10. An optical coherent receiver, comprising:

a local oscillator laser, for supplying a local oscillator optical signal;

an optical 90 degree frequency mixer, for mixing a received optical signal with the local oscillator optical signal;

first and second balancing photoelectric detectors, for converting the optical signals outputted from the optical 90 degree frequency mixer into baseband electrical signals;

a A/D converter, for converting output signals from the first and the second balancing photoelectric detectors into digital signals;

an argument calculator, for obtaining a phase of the digital signals;

a phase estimating section, for obtaining a phase difference between a carrier signal of the received optical signal and the local oscillator optical signal; and a decoder, for subtracting the phase difference obtained by the phase estimating section from an output of the argument calculator to recover transmitted data;

wherein a first input terminal of the optical 90 degree frequency mixer is connected to the external input; a second input terminal of the optical 90 degree frequency mixer is connected to an output of the local oscillator laser; a first output terminal and a second output terminal of the optical 90 degree frequency mixer are respectively connected to input terminals of the first and the second balancing photoelectric detectors; output terminals of the first and the second balancing photoelectric detectors are respectively connected to first and second input terminals of the A/D converter; first and second output terminals of the A/D converter are respectively connected to first and second input terminals of the phase estimating section and first and second input terminals of the argument calculator; an output terminal of the argument calculator is connected to a first input terminal of the decoder; and an output terminal of the phase estimating section is connected to a second input terminal of the decoder;

and wherein said phase estimating section comprising:

the phase estimator according to claim 1 or 2, for generating a phase estimation signal in accordance with the digital signals;

fourth and fifth absolute value calculators (1004, 1005), for respectively calculating absolute values of first and second outputs of the A/D converter;

an adder, for calculating a sum of the absolute values of the first and the second outputs of the A/D converter;

a look up table, for generating a phase difference in accordance with the phase estimation signal and the sum of the absolute values; and an averager, for removing noise from the phase difference;

wherein a first and a second input terminals of the phase estimator are respectively connected to a first and a second output terminals of the A/D converter; an output terminal of the phase estimator is connected to a first input terminal of the look up table; an input terminal of the fourth absolute value calculator (1004) is connected to a first output terminal of the A/D converter; an output terminal of the fourth absolute value calculator (1004) is connected to a first input terminal of the adder; an input terminal of the fifth absolute value calculator (1005) is connected to a second output terminal of the A/D converter; an output terminal of the fifth absolute value calculator (1005) is connected to a second input terminal of the adder; an output terminal of the adder is connected to a second input terminal of the look up table; an output terminal of the look up table is connected to an input terminal of the averager; and an output terminal of the averager is connected to a second input terminal of the decoder.

11. An optical coherent receiver, comprising:
a local oscillator laser, for supplying a local oscillator optical signal;
an optical 90 degree frequency mixer, for mixing a received optical signal with the local oscillator optical signal;
first and second balancing photoelectric detectors, for converting the optical signals outputted from the optical 90 degree frequency mixer into baseband electrical signals;
a A/D converter, for converting output signals from the first and the second balancing photoelectric detectors into digital signals;
an argument calculator, for obtaining a phase of the digital signals;
a phase estimating section, for obtaining a phase difference between a carrier signal of the received optical signal and the local oscillator optical signal; and
a decoder, for subtracting the phase difference obtained by the phase estimating section from an output of the argument calculator to recover transmitted data;
wherein a first input terminal of the optical 90 degree frequency mixer is connected to the external input; a second input terminal of the optical 90 degree frequency mixer is connected to an output of the local oscillator laser; a first output terminal and a second output terminal of the optical 90 degree frequency mixer are respectively connected to input terminals of the first and the second balancing photoelectric detectors; output terminals of the first and the second balancing photoelectric detectors are respectively connected to first and second input terminals of the A/D converter; first and second output terminals of the A/D converter are respectively connected to first and second input terminals of the phase estimating section and first and second input terminals of the argument calculator; an output terminal of the argument calculator is connected to a first input terminal of the decoder; and an output terminal of the phase estimating section is connected to a second input terminal of the decoder;
and wherein said phase estimating section comprising:
the phase estimator according to claim 1 or 2, for generating a phase estimation signal in accordance with the digital signals;
fourth and fifth absolute value calculators (1004, 1005), for respectively calculating absolute values of first and second outputs of the A/D converter;
an adder, for calculating a sum of the absolute values of the first and the second outputs of the A/D converter;
a first averager, for removing noise from the phase estimation signal;
a second averager, for removing noise from the sum of the absolute values; and
a look up table, for generating a phase difference in accordance with the phase estimation signal and the sum of the absolute values removed of noise,
wherein a first and a second input terminals of the phase estimator are respectively connected to a first and a second output terminals of the A/D converter; an output terminal of the phase estimator is connected to a input terminal of the first averager; an input terminal of the fourth absolute value calculator (1004) is connected to a first output terminal of the A/D converter; an output terminal of the fourth absolute value calculator (1004) is connected to a first input terminal of the adder; an input terminal of the fifth absolute value calculator (1005) is connected to a second output terminal of the A/D converter; an output terminal of the fifth absolute value calculator (1005) is connected to a second input terminal of the adder; an output terminal of the adder is connected to a input terminal of the second averager; an output terminal of the first averager is connected to a first input terminal of the look up table; an output terminal of the second averager is connected to a second input terminal of the look up table; and an output terminal of the look up table is connected to a second input terminal of the decoder.

12. A digital phase estimation method for generating a phase estimation signal, comprising the steps of:
calculating an absolute value of a first input signal by means of a first absolute value calculator;
calculating an absolute value of a second input signal by means of a second absolute value calculator;
obtaining a sign of the first input signal by means of a first sign calculator and outputting the sign of the first input signal to a first terminal of a first multiplier;
obtaining a sign of the second input signal by means of a second sign calculator and outputting the sign of the second input signal to a second input terminal of the first multiplier;
obtaining a difference of subtracting the absolute value of the first input signal from the absolute value of the second input signal by means of a subtracter to a third input terminal of the first multiplier; and
multiplying the difference between the absolute values of the first input signal and the second input signal with the signs of the first input signal and the second input signal by means of the first multiplier (406), and outputting the multiplying result as the phase estimation signal.

13. The digital phase estimation method according to claim 12, wherein the step of multiplying comprising:
obtaining, by means of a third sign calculator, a sign of the difference obtained by the subtracter;
obtaining, by means of a third absolute value calculator, an absolute value of the difference obtained by the subtracter;
performing, by means of an exclusive-OR calculator, exclusive-OR operation on the signs obtained by the first, the second and the third sign calculators; and
combining, by means of a combiner, the absolute value obtained by the third absolute value calculators with the result of the exclusive-OR operation performed by the exclusive-OR calculator, to obtain the multiplying result.

14. The digital phase estimation method according to claim 12 or 13, further comprising, when the method starts, the following step of:
normalizing the first input signal and the second input signal, said step comprising:
obtaining a square of the first input signal by means of a first square calculator;
obtaining a square of the second input signal by means of a second square calculator;
obtaining a sum of the square of the first input signal and the square of the second input signal by means of an adder;
obtaining a square root of the sum by means of a square root calculator;
obtaining an inverse number of the square root by means of an inverse number calculator;

multiplying the inverse number with the first input signal by means of a second multiplier (506), and outputting the multiplying result to the first sign calculator and the first absolute value calculator; and multiplying the inverse number with the second input signal by means of a third multiplier (507), and outputting the multiplying result to the second sign calculator and the second absolute value calculator.

15. The digital phase estimation method according to claim 14, further comprising the following step of:

calculating a phase difference in accordance with an output of the first multiplier (406), said step comprising:

calculating a value of $1/\sqrt{2}$ by means of a $1/\sqrt{2}$ calculator;

multiplying, by means of a fourth multiplier (510), the output of the first multiplier (406) with an output of the $1/\sqrt{2}$ calculator, and outputting the multiplying result; and performing an arcsine operation on an output of the fourth multiplier (510) by means of an arcsine calculator to obtain the phase difference.

16. An optical coherent reception method, comprising:

supplying a local oscillator optical signal by means of a local oscillator laser;

mixing a received optical signal with the local oscillator optical signal by means of an optical 90 degree frequency mixer;

converting, by means of first and second balancing photoelectric detectors, the optical signals outputted from the optical 90 degree frequency mixer into baseband electrical signals;

converting, by means of a A/D converter, output signals from the first and the second balancing photoelectric detectors respectively into digital signals;

obtaining a phase of the digital signal by means of an argument calculator;

obtaining a phase difference between a carrier signal of the received optical signal and the local oscillator optical signal; and subtracting, by means of a decoder, the phase difference obtained by the phase estimating section from an output of the argument calculator to recover transmitted data;

wherein the step of obtaining the phase difference comprises:

generating, through the phase estimation method according to claim 15, a phase difference in accordance with the digital signals; and removing noise from the phase difference by means of an averager.

17. A digital phase lock method, comprising:

the phase estimation method according to any one of claims 12-15, for detecting a phase difference between a carrier signal of an input signal and a local oscillator signal, and outputting a phase estimation signal;

filtering, by means of a loop filter, the phase estimation signal to remove noise;

generating, by means of a modulo integrator, a constellation rotation angle in accordance with the phase estimation signal outputted by the loop filter and removed of noise, and outputting the constellation rotation angle; and rotating, by means of a constellation rotator, input signal including the first input signal and the second input signal in accordance with the constellation rotation angle to compensate the phase difference between the carrier signal and the local oscillator signal of the input signal, and outputting the signal having undergone constellation rotation.

18. The digital phase lock method according to claim 17, wherein the modulo integrator comprises an adder, a modulo $2\pi$ calculator and a 1 symbol delayer, and wherein the step of generating the constellation rotation angle comprises the following steps of:

performing, by means of the modulo $2\pi$ calculator, modulo $2\pi$ operation on an output of the adder; and delaying, by means of the 1 symbol delayer, an output of the modulo $2\pi$ calculator for one symbol, and outputting it to the adder.

19. The digital phase lock method according to claim 18, wherein the step of rotating the input signal comprises:

generating a sine value of the inputted constellation rotation angle by means of a sine generator;

generating a cosine value of the constellation rotation angle by means of a cosine generator;

multiplying an output of the sine generator with a second input signal in the input signal by means of a first multiplier, and outputting the multiplying result;

multiplying an output of the cosine generator with the second input signal in the input signal by means of a second multiplier, and outputting the multiplying result;

multiplying an output of the sine generator with the first input signal in the input signal by means of a third multiplier, and outputting the multiplying result;

multiplying an output of the cosine generator with the first input signal in the input signal by means of a fourth multiplier, and outputting the multiplying result;

calculating, by means of a subtracter, a difference of subtracting an output of the third multiplier from an output of the second multiplier, and outputting the result; and calculating, by means of an adder, a sum of an output of the first multiplier and an output of the fourth multiplier, and outputting the result.

20. An optical coherent reception method, comprising:

supplying a local oscillator optical signal by means of a local oscillator laser;

mixing a received optical signal with the local oscillator optical signal by means of an optical 90 degree frequency mixer;

converting, by means of first and second balancing photoelectric detectors, the optical signals outputted from the optical 90 degree frequency mixer into baseband electrical signals;

converting, by means of first and second A/D converters respectively, output signals from the first and the second balancing photoelectric detectors into digital signals;

compensating, in accordance with the digital phase lock method according to any one of claims 17-19, a phase difference between a carrier signal of the received optical signal and the local oscillator optical signal, and outputting the compensated signal; and recovering data from the compensated signal by means of a data recovering unit.

21. An optical coherent reception method, comprising:

supplying a local oscillator optical signal by means of a local oscillator laser;

mixing a received optical signal with the local oscillator optical signal by means of an optical 90 degree frequency mixer;

converting, by means of first and second balancing photoelectric detectors, the optical signals outputted from the optical 90 degree frequency mixer into baseband electrical signals;

converting, by means of a A/D converter, output signals from the first and the second balancing photoelectric detectors respectively into digital signals;

obtaining a phase of the digital signals by means of an argument calculator;

obtaining, by means of a phase estimating section, a phase difference between a carrier signal of the received optical signal and the local oscillator optical signal; and subtracting, by means of a decoder, the phase difference obtained by the phase estimating section from an output of the argument obtainer to recover transmitted data;

wherein the step of obtaining the phase difference comprises:

generating, through the phase estimation method according to claim 12 or 13, a phase estimation signal in accordance with the digital signals;

calculating absolute values of an output of the A/D converter by means of fourth and fifth absolute value calculators (1004, 1005);

calculating, by means of an adder, a sum of the absolute values of the outputs of the A/D converter;

generating, by means of a look up table, a phase difference in accordance with the phase estimation signal and the sum of the absolute values; and removing noise from the phase difference by means of an averager.

22. An optical coherent reception method, comprising:

supplying a local oscillator optical signal by means of a local oscillator laser;

mixing a received optical signal with the local oscillator optical signal by means of an optical 90 degree frequency mixer;

converting, by means of first and second balancing photoelectric detectors, the optical signals outputted from the optical 90 degree frequency mixer into baseband electrical signals;

converting, by means of a A/D converter, output signals from the first and the second balancing photoelectric detectors respectively into digital signals;

obtaining a phase of the digital signals by means of an argument calculator;

obtaining, by means of a phase estimating section, a phase difference between a carrier signal of the received optical signal and the local oscillator optical signal; and subtracting, by means of a decoder, the phase difference obtained by the phase estimating section from an output of the argument obtainer to recover transmitted data;

wherein the step of obtaining the phase difference comprises:

generating, through the phase estimation method according to claim 12 or 13, a phase estimation signal in accordance with the digital signals;

calculating absolute values of an output of the A/D converter by means of fourth and fifth absolute value calculators (1004, 1005);

calculating, by means of an adder, a sum of the absolute values of the outputs of the A/D converter;

removing noise from the phase estimation signal by means of a first averager;

removing noise from the sum of the absolute values by means of a second averager; and generating, by means of a look up table, a phase difference in accordance with the phase estimation signal and the sum of the absolute values removed of noise.

* * * * *